(12) United States Patent  
Shin et al.

(10) Patent No.: US 6,445,385 B1  
(45) Date of Patent: Sep. 3, 2002

(54) ASSEMBLY STRUCTURE OF DISPLAY OF ELECTRONIC APPLIANCE

(75) Inventors: Hyun-kuk Shin, Suwon; Bum-soo Kim, Seoul, both of (KR); Seong-sik Shin, Cupertino, CA (US)

(73) Assignee: Samsung Electronics Co., Ltd., Kyungki-Do (KR)

(*) Notice: Subject to any disclaimer, the term of this patent is extended or adjusted under 35 U.S.C. 154(b) by 0 days.

(21) Appl. No.: 09/332,948

(22) Filed: Jun. 15, 1999

(30) Foreign Application Priority Data

Jun. 15, 1998 (KR) ............................................. 98-22392

(51) Int. Cl.[7] ................................................. G09G 5/00
(52) U.S. Cl. ...................... 345/204; 345/905; 248/918; 361/681
(58) Field of Search ........................... 439/372; 361/393, 361/681, 687; 359/154; 235/462.36; 348/552; 345/905; 248/918

(56) References Cited

U.S. PATENT DOCUMENTS

| | | | | |
|---|---|---|---|---|
| 5,030,128 A | * | 7/1991 | Herron et al. | 439/372 |
| 5,196,993 A | * | 3/1993 | Herron et al. | 361/393 |
| 5,253,139 A | * | 10/1993 | Satou | 361/681 |
| 5,774,333 A | * | 6/1998 | Janik et al. | 361/687 |
| 5,796,576 A | * | 8/1998 | Kim | 16/259 |
| 5,805,415 A | * | 9/1998 | Tran et al. | 248/918 |
| 5,949,565 A | * | 9/1999 | Ishida | 359/154 |
| 6,059,188 A | * | 5/2000 | diFazio et al. | 235/462.36 |
| 6,169,582 B1 | * | 1/2001 | Lee | 348/552 |

FOREIGN PATENT DOCUMENTS

| | | |
|---|---|---|
| JP | 3-84883 U | 8/1991 |
| JP | 06004176 A | 1/1994 |
| JP | 06250052 A | 9/1994 |
| JP | 06266472 A | 9/1994 |
| JP | 09057062 A | 3/1995 |

* cited by examiner

Primary Examiner—Steven Saras  
Assistant Examiner—Christopher Maier  
(74) Attorney, Agent, or Firm—Sughrue Mion, PLLC (57) ABSTRACT

An assembly structure for a display of an electronic appliance is provided. The electronic appliance includes a main body and a display for displaying an image according to an image signal input from the main body so as to facilitate the attachment and detachment of the display to and from the main body. The assembly structure includes a fitting device formed at the main body and the display. The fitting device has a fitting member which slidably fits into a fitting hole. An optical connector is provided between the main body and the display to be attached to the main body for transferring an image signal using light beams for the display.

15 Claims, 8 Drawing Sheets

ASSEMBLY STRUCTURE OF DISPLAY OF ELECTRONIC APPLIANCE

BACKGROUND OF THE INVENTION

1. Field of the Invention

The present invention relates to an assembly structure of a display of an electronic appliance, and more particularly, to an assembly structure of a display of an electronic appliance capable of being attached to and detached from a main body.

2. Description of the Related Art

In general, a main body and display are integrated in a portable electronic appliance having a display, such as a notebook computer, web video phone, and digital video camera.

Figure 1:
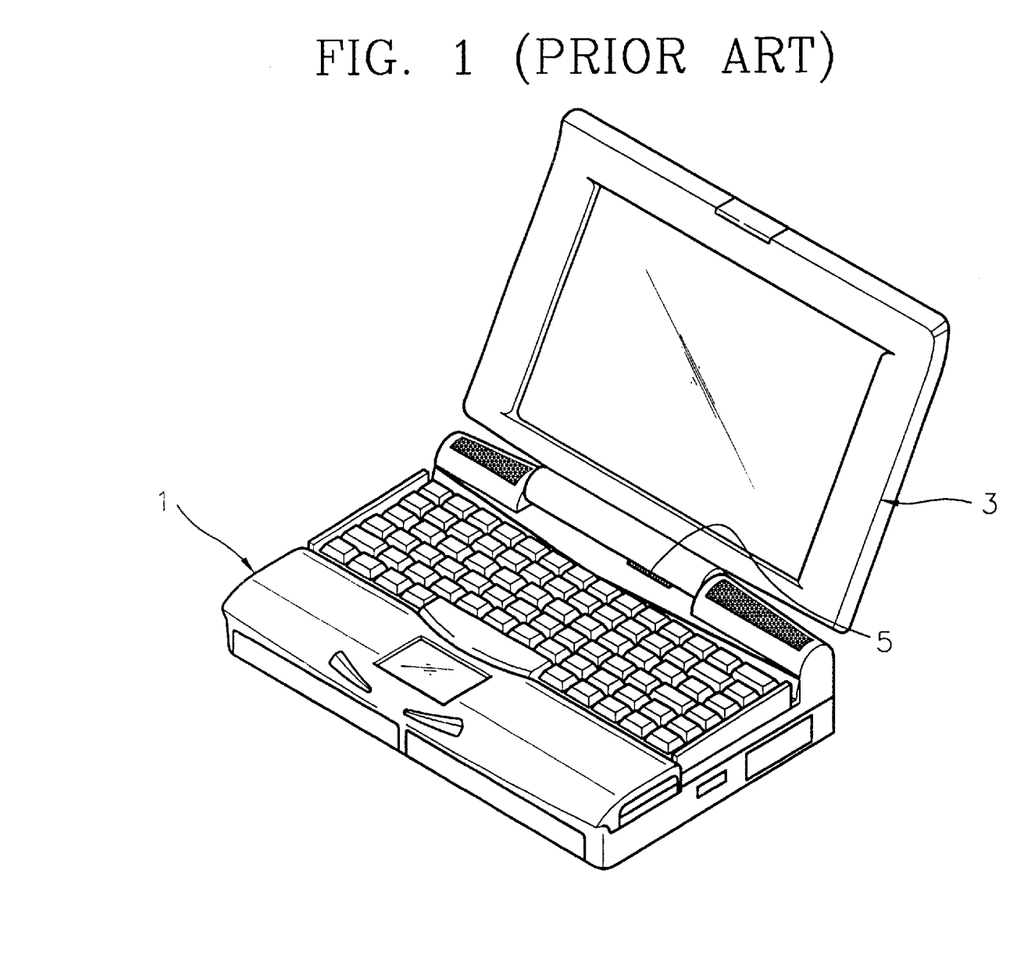
FIG. 1 is a perspective view illustrating a conventional notebook computer as an example of an electronic appliance having a display.

FIG. 1 is a perspective view illustrating a conventional notebook computer as an example of an electronic appliance having a display. As shown in FIG. 1, a notebook computer comprises a main body 1 equipped with a computer system, and a displaying 3 for display images according to an image signal from the main body 1.

The main body 1 is provided with an input device such as a keyboard and mouse capable of inputting operation instructions, peripheral devices such as a hard disk drive, CD-ROM drive, modem and LAN card, a sound device for reproducing audio information, etc. The display 3, as an output device for outputting information from the main body 1 in the form of images, is hinged to a side of the main body 1 to be opened and closed, and is electrically connected to the main body 1 by ribbon type cables 5.

In the electronic appliance having a display so configured, since the display 3 is directly hinged to the main body 1, and is electrically connected to the main body 1 by ribbon type cables 5, the display 3 cannot be replaced by a user. That is, the display 3 cannot be replaced with a display having a higher resolution or a larger display area. Further, in such an electronic appliance there is a drawback in that when either the main body 1 or the display 3 malfunctions or reaches the end of its lifespan, the user cannot replace it easily.

SUMMARY OF THE INVENTION

To solve the above problems, it is an objective of the present invention to provide an assembly structure of a display of an electronic appliance capable of being attached and detached from a main body.

Accordingly, to achieve the above objective, there is provided an assembly structure of a display of an electronic appliance intended to be employed in an electronic appliance including a main body and a display for displaying an image according to an image signal input from the main body so as to facilitate the attachment and detachment of the display to and from the main body including: a fitting means formed at the main body and the display, respectively; and an optical connector provided at the main body and the display to be attached to the main body for transferring an image signal using light beams.

BRIEF DESCRIPTION OF THE DRAWINGS

The above objective and advantage of the present invention will become more apparent by describing in detail preferred embodiments thereof with reference to the attached drawings in which.

DESCRIPTION OF THE PREFERRED EMBODIMENTS

Figure 2:
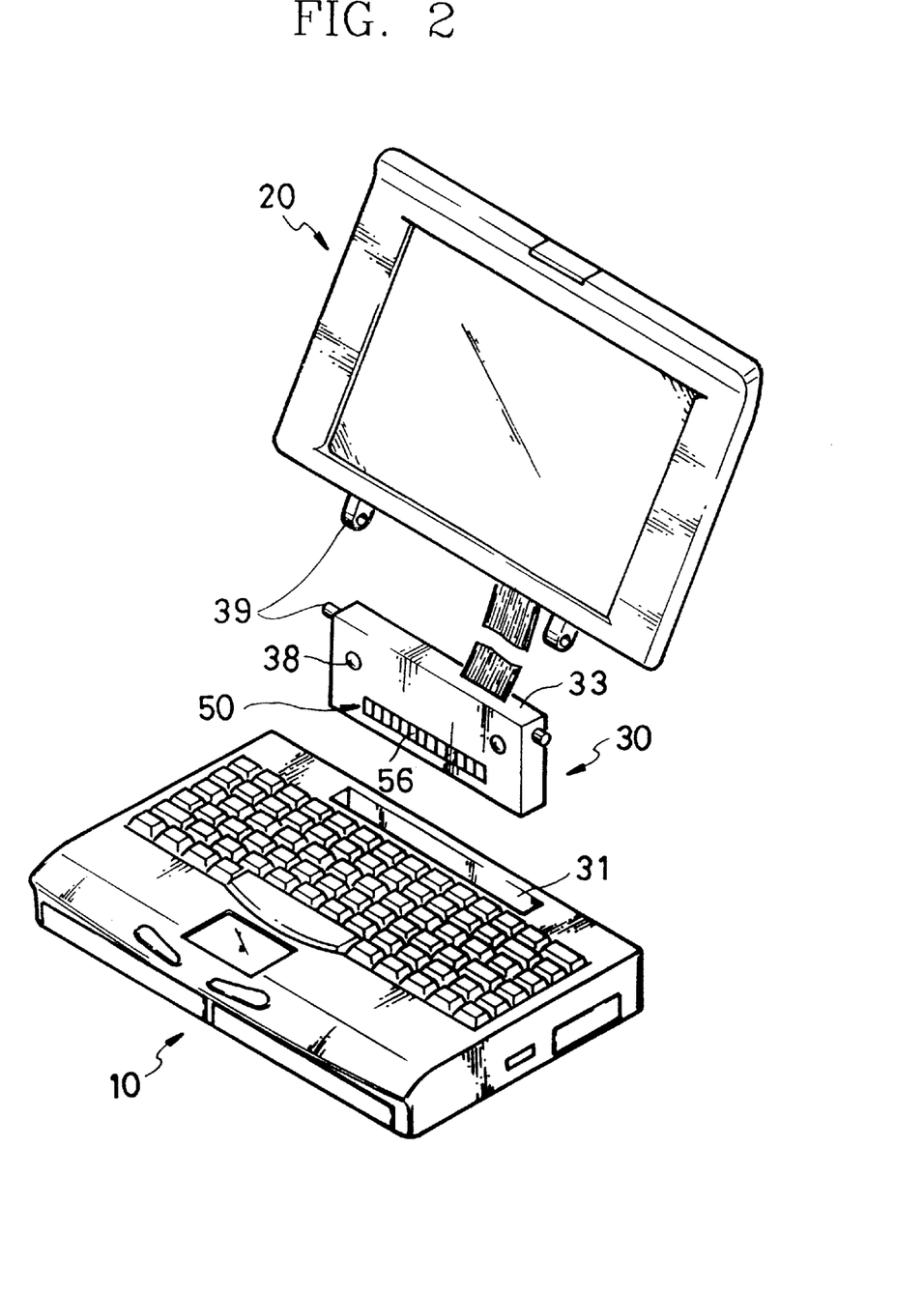
FIG. 2 is an exploded perspective view illustrating a display assembly structure of an electronic appliance according to a first embodiment of the present invention.
Figure 3:
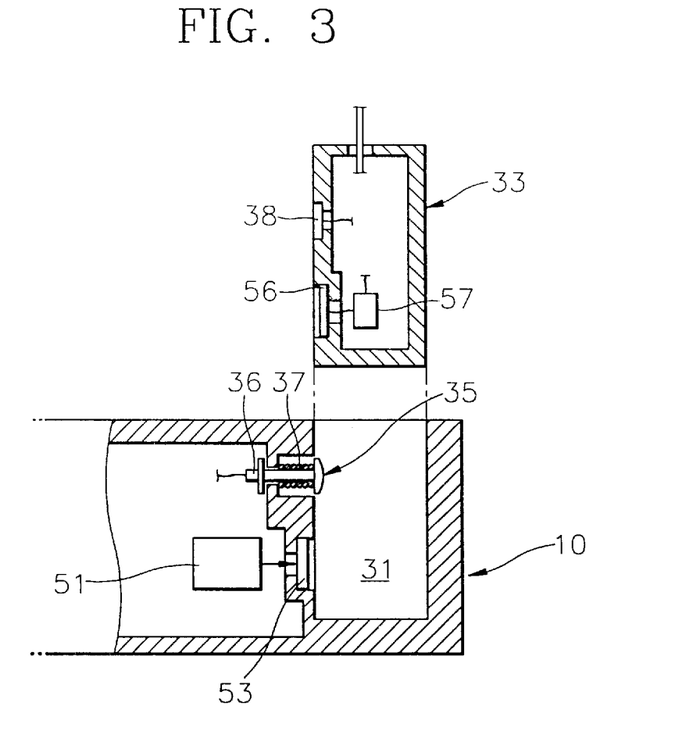
FIG. 3 is a section view of a portion of FIG. 2 in a detached state.
Figure 4:
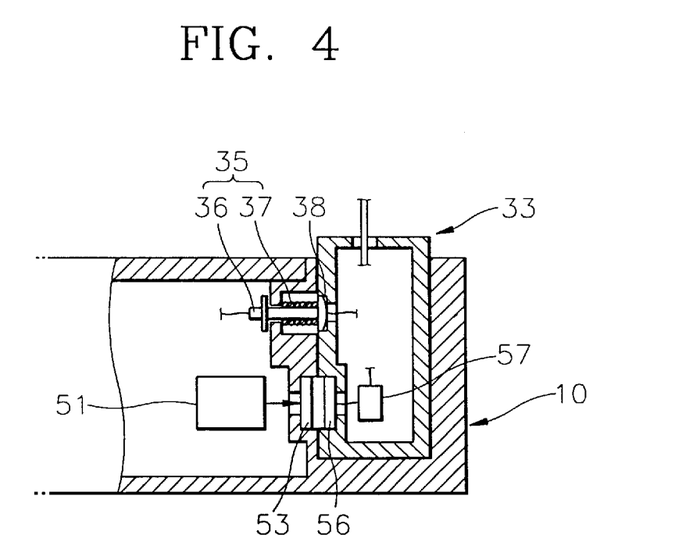
FIG. 4 is a section view of a portion of FIG. 2 in an attached state.

FIG. 2 is an exploded perspective view illustrating a display assembly structure of an electronic appliance according to a first embodiment of the present invention, FIG. 3 is a section view of a portion of FIG. 2 in a detached state, and FIG. 4 is a section view of a portion of FIG. 2 in an attached state. FIG. 2 shows a notebook computer as an example of an electronic appliance having a display.

As shown in FIGS. 2, 3 and 4, a display assembly structure of an electronic appliance is employed in an electronic appliance which includes a main body 10 and a display 20 for displaying an image signal from the main body 10. The display assembly structure of an electronic appliance comprises a fitting means 30 formed at the main body 10 and the display 20 so as to fit the display 20 to the main body 10, and an optical connector 50 for transferring an image signal by using light.

Here, a fitting hole 31 into which the display 20 is fitted is provided at the main body 10. The fitting means 30 includes a first electrode portion 35 installed at the main body 10 for one end of the first electrode portion 35 to be projected into the fitting hole 31, a fitting member 33 installed at the display 20 to be fitted into the fitting hole 31, and a second electrode portion 38 installed at the fitting member 33 and contacting the first electrode portion 35 when the fitting member 33 is fitted into the fitting hole 31.

The first electrode portion 35 comprises an electrode rod (or electrode bar) 36 slidably installed at the main body 10, and an elastic member 37 interposed between the main body 10 and the electrode rod 36 for elastically biasing one end of the electrode rod 36 to be projected into the fitting hole 31, and the second electrode portion 38 includes an electrode plate installed at the fitting member 33. Therefore, when the fitting member 33 is fitted into the fitting hole 31, the electrode rod 36 contacts the second electrode portion 38 by the elastic bias of the elastic member 37.

Although not shown, it should be understood that the first electrode portion 35 may be composed of an electrode plate and the second electrode portion 38 may be composed of an electrode rod and an elastic member, or both first and second electrode portions 35 and 38 may be composed of respective electrode rods and elastic members.

The fitting member 33 may be fixedly installed at the display 20 depending on the type and use of an electronic appliance, or attached to the display 20 by hinges as shown in FIG. 2.

In particular, in the case of a notebook computer, the fitting member 33 is attached to the display 20 by hinges 39, and the display 20 can be opened or closed by pivoting the display 20 with respect to the main body 10 in a state in which the fitting member 33 is fitted into the fitting hole 31.

Figure 5:
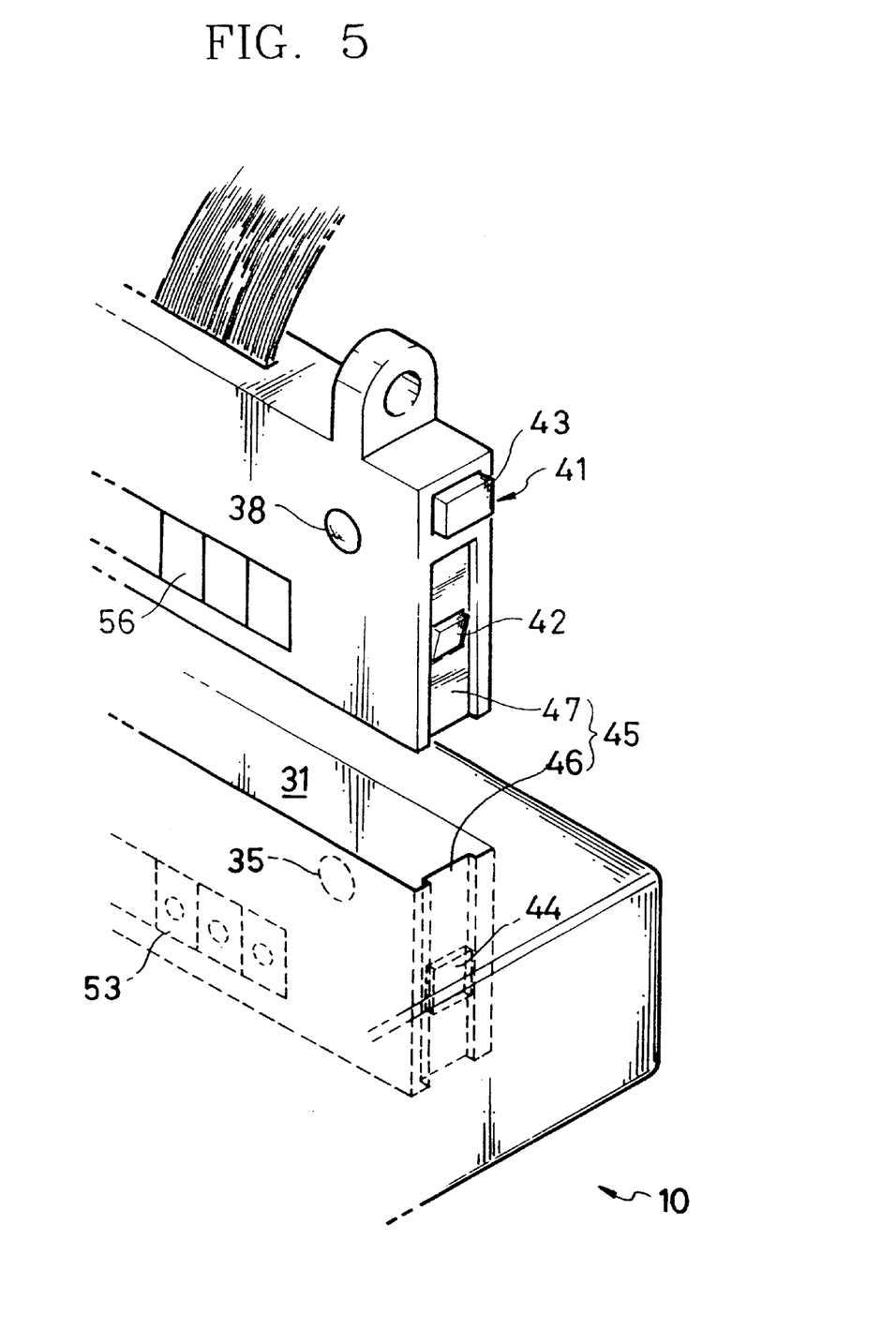
FIG. 5 is an exploded perspective view illustrating a display assembly structure of an electronic appliance according to a second embodiment of the present invention.

In a second embodiment, the fitting means 30 may include a locking means 41 which can lock the fitting means 30 in the fitting hole 31, as shown in FIG. 5.

The locking means 41 includes a locking member 42 installed at at least one side of the fitting member 33 facing a respective side wall of the fitting hole 31 so that the locking member 42 can move into or out of the fitting member 33, a lock releasing button 43 installed at the fitting member 33 so as to be disposed outside of the fitting hole 31 when the fitting member 33 is fitted into the fitting hole 31 for releasing the fitting member 33 from the fitting hole 31, and a locking recess 44 formed at one side wall of the fitting hole 31 of the main body 10 for locking the locking member 42 in it. The locking member 42 is installed in the fitting member 33 while being biased to be projected toward the locking recess 44. When the fitting member 33 is fitted into the fitting hole 31, the locking member 42 is pressed inwardly by the side wall of fitting hole 31 and is locked in the locking recess 44 when the fitting member 33 reaches the locking recess 44. On the other hand, when the lock releasing button 43 is pressed, the locking member 42 is moved inwardly and released from the locking recess 44, and consequently, the fitting member 33 can be detached from the main body 31.

In addition, it is preferable that at least one guide means 45 for guiding the insertion of the fitting member 33 is formed at the fitting hole 31 and the fitting member 33 so as to prevent the fitting member 33 from loosely moving within the fitting hole 31.

The guide means 45 may comprise a guide projection 46 formed on the side wall of the fitting hole 31 of the main body 10, and a guide rail 47 inwardly formed on the fitting member 33 to correspond to the guide projection 46. Therefore, the loose movement of the fitting member 33 within the fitting hole 31 is prevented, and the first and second electrode portions 35 and 38 contact each other correctly and the optical connector 50 is arranged properly.

Figure 6:
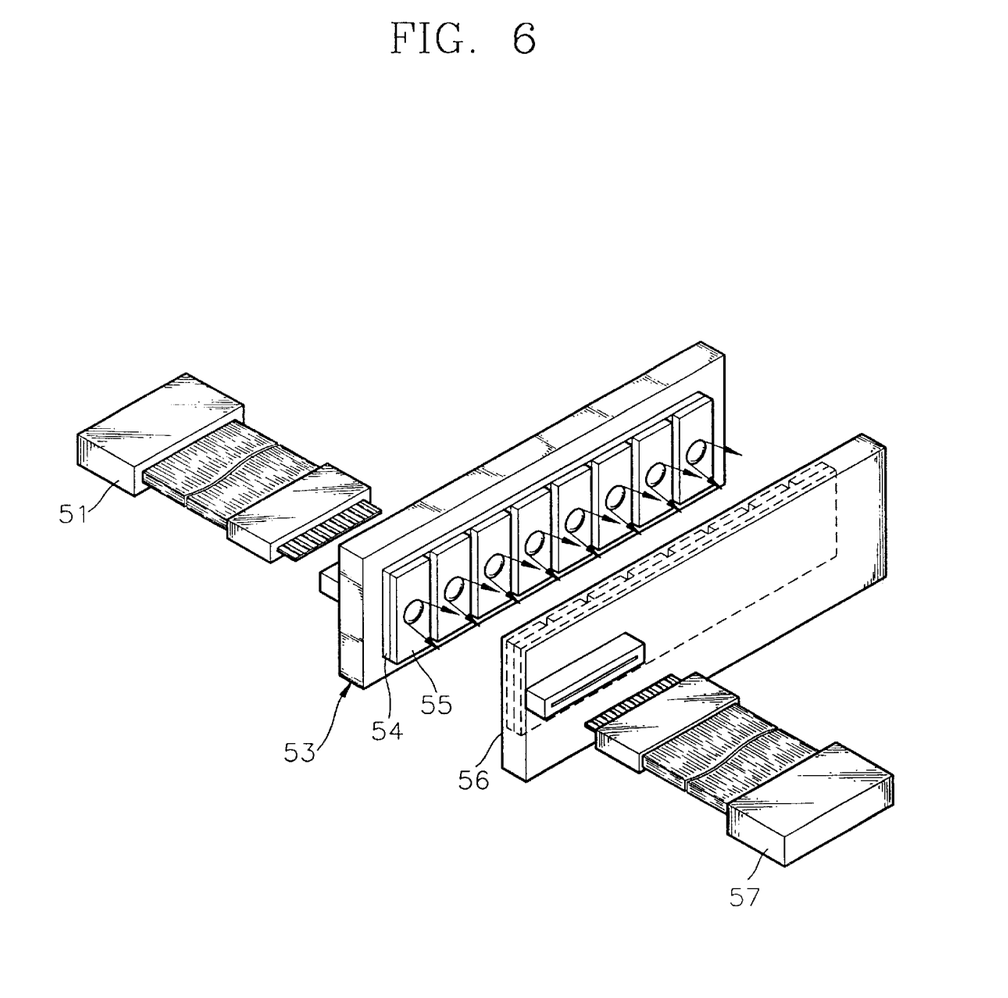
FIG. 6 is an exploded view illustrating an optical connector as a part of a display assembly structure of an electronic appliance according to the present invention.

Referring to FIGS. 3 and 6, the optical connector 50 comprises first and second signal processing units 51 and 57, a semiconductor laser array 53 installed at the main body 10, and a photodetector array 56 in which each photodetector converts a received light beam into an electrical signal, independently.

The first signal processing unit 51 is installed in the main body 10, and converts an image signal output from the main body 10 into a driving signal of the semiconductor laser array 53.

The semiconductor laser array 53 is installed at the main body 10 to face one side wall of the fitting hole 31, is composed of a plurality of semiconductor lasers each independently irradiating a light beam according to a received driving signal. Here, it is preferable that the semiconductor laser array 53 is composed of a plurality of vertical cavity surface emitting lasers 55 emitting a light beam in a direction of the stack of semiconductor layers. In this case, the vertical cavity surface emitting laser array 53 may be arranged on a single substrate 54.

The photodetector array 56 is installed at the fitting member 33 to face the semiconductor laser array 53 and to be spaced from it at a distance. The photodetectors composing the photodetector array 56 are provided to correspond to the semiconductor lasers 55 in number, receive light beams emitted from the corresponding semiconductor lasers 55, and convert the light beams into respective electrical signals to be output. Here, it is preferable that the photodetector array 56 is composed of phototransistors or photodiodes. Since the phototransistors and the photodiodes in themselves are well-known the detailed descriptions are omitted.

The second signal processing unit 57 is installed within the fitting member 33 or the display 20, and converts the electrical signals output from the photodetector array into image signals for the display 20.

Figure 7:
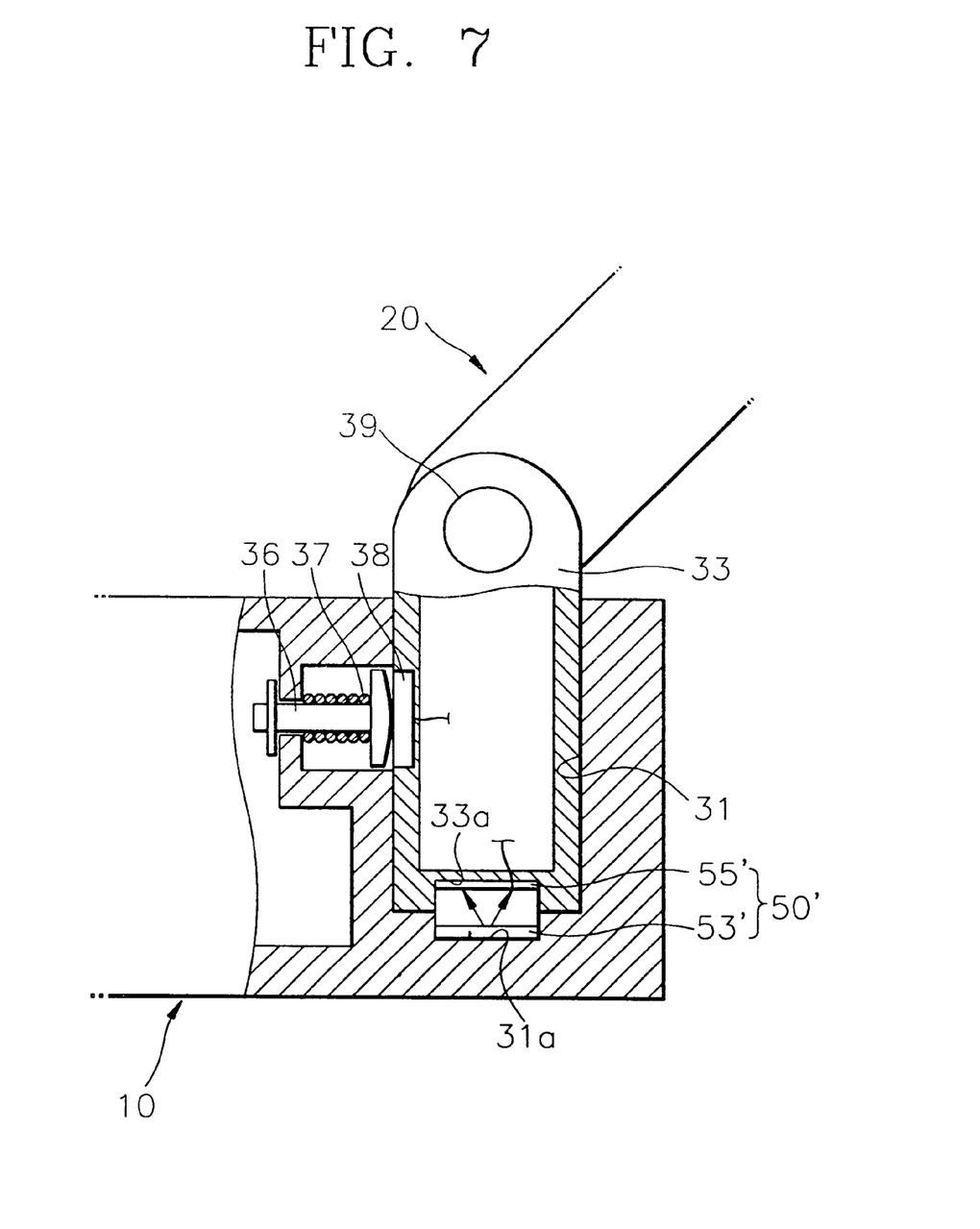
FIG. 7 is an exploded perspective view illustrating a display assembly structure of an electronic appliance according to a third embodiment of the present invention.

In a third embodiment as shown in FIG. 7, a semiconductor laser array 53' and a photodetector array 55' which compose an optical connector 50' are disposed at the bottom sides 31a and 33a of the fitting hole 31 and the fitting member 33 to face each other so as to emit and receive light beams in a direction of the insertion of the fitting member 33. In this case, when the fitting member 33 is attached to the fitting hole 31, since there is an assembly tolerance in a direction of the light beam traveling, a decrease in the illuminance on the photodetector and the light interference between neighboring photodetectors can be reduced.

Figure 8A:
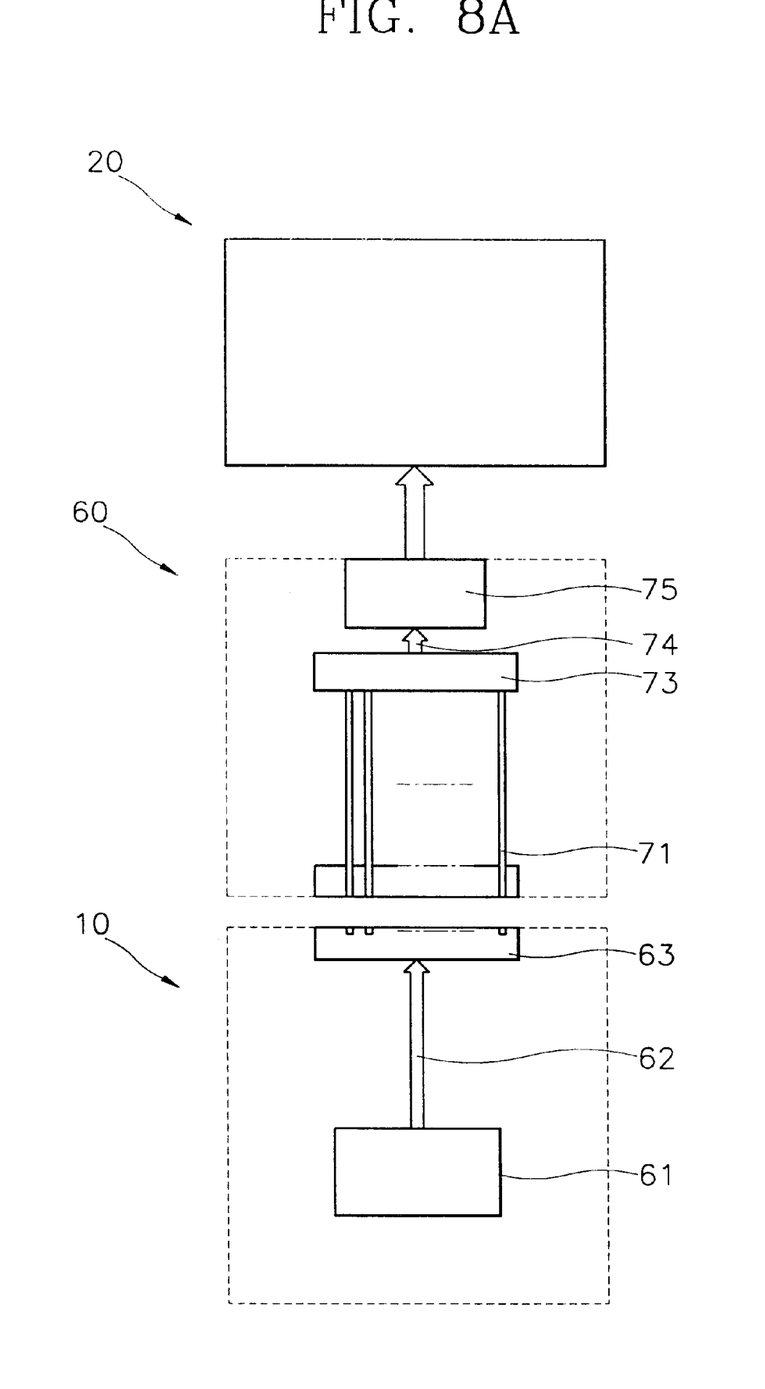
FIGS. 8A and 8B show schematic diagrams illustrating display assembly structures of an electronic appliance according to further embodiments of the present invention.

Referring to FIG. 8A, an optical connector 60 according to another embodiment of the present invention comprises first and second signal processing units 61 and 75, a semiconductor laser array 63 installed at the main body 10, a photodetector array 73 in which each photodetector converts a received light beam into an electrical signal, independently, and an optical fiber bundle 71 for transferring the optical signals emitted from the semiconductor laser array 63 to the photodetector array 73.

Here, the first signal processing unit 61 and the semiconductor laser array 63 are connected to each other by an electrical cable 62, image signals emitted from the semiconductor laser array 63 are directly transferred to the outside of the main body 10.

The photodetector array 73 is connected to the second signal processing unit 75 by an electrical cable 74, and is disposed near the second signal processing unit 75. This is intended to prevent the degradation of signals occurring when the signals are transferred via the electrical cable 74. In this case, when the assembly structure as shown in FIG. 3 is applied to the optical connector 60, it is difficult, due to the limitation of installation space, to dispose the photodetector array 73 so that the photodetector array 73 may receive directly light signals emitted from the semiconductor laser array 63. The optical fiber bundle 71 is employed for solving the problem of disposition. The optical fiber bundle 71 composed of a plurality of optical fibers is disposed between the photodetector array 73 and the semiconductor laser array 63 so as to optically transfer image signals of multi-channels therebetween.

Here, since the optical connection between the semiconductor laser array 63 and the optical fiber bundle 71 is embodied by assembling a fitting member (33 in FIG. 3) into a fitting hole (31 in FIG. 3) as described above detailed descriptions thereof are omitted.

Thus, when the length of the electrical cable 74 between the photodetector array 73 and the second signal processing unit 75 is reduced by using the optical fiber bundle 71, the sensitivity of the current signal having a level of the order of micro-amperes and transferred via the electrical cable 74 can be enhanced.

Figure 8B:
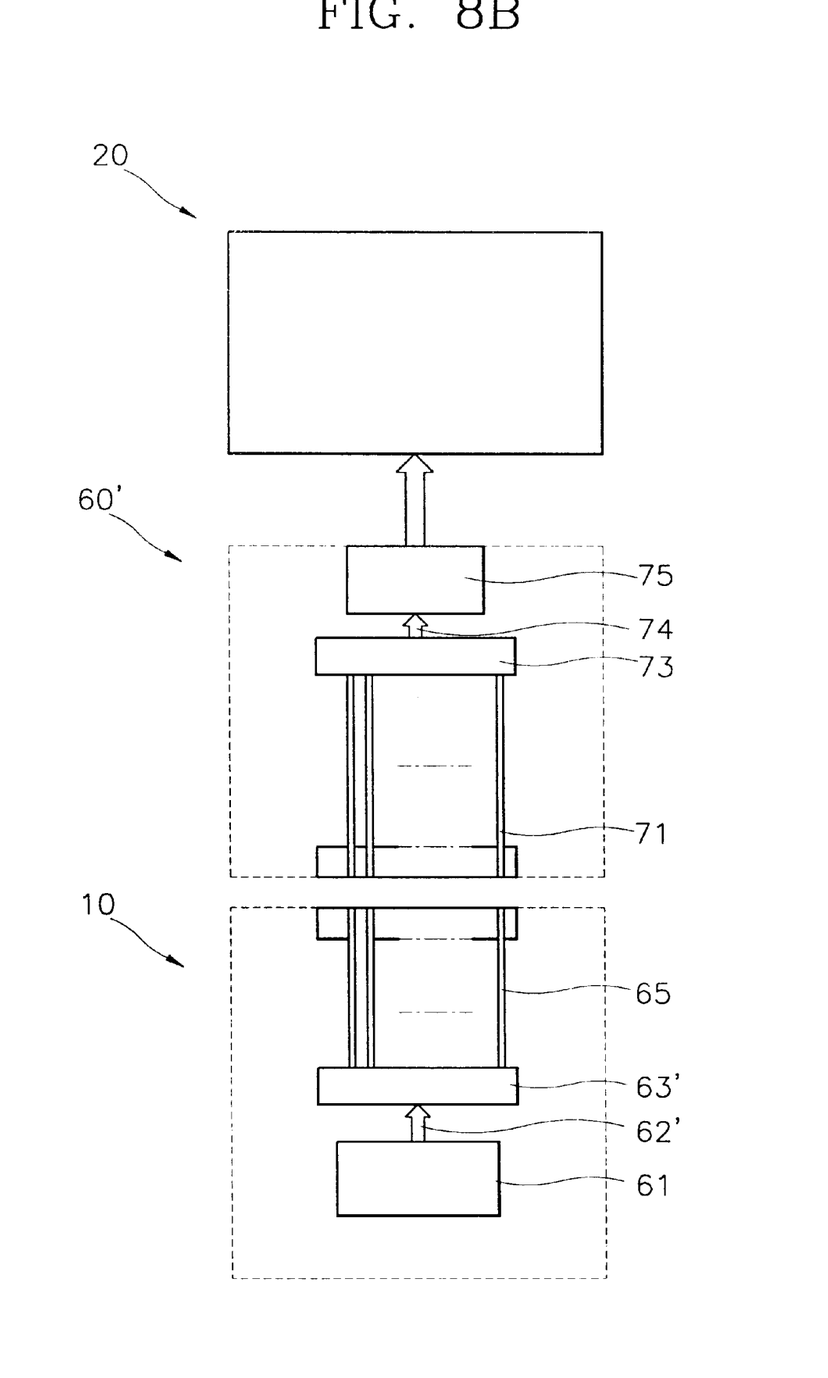

Referring to FIG. 8B, an optical connector 60' according to still another embodiment of the present invention comprises first and second signal processing units 61 and 75, a semiconductor laser array 63' installed at the main body 10, a photodetector array 73 in which each photodetector converts a received light beam into an electrical signal, independently, and first and second optical fiber bundles 65 and 71 for transferring the optical signals emitted from the semiconductor laser array 63' to the photodetector array 73.

The semiconductor laser array 63' is disposed near the first signal processing unit 61, and is connected to the first signal processing unit 61 by a relatively shorter electrical cable 62'. The image signals emitted from the semiconductor laser array 63' are transferred to the outside of the main body 10 via the first optical fiber bundle 65. In addition, the photodetector array 73 is connected to the second signal processing unit by the electrical cable 74 while being disposed near the second signal processing unit 75. The photodetector array 73 receives the image signals from the second optical fiber bundle 71 which is disposed to face one end of the first optical fiber bundle 65 at one end thereof and to face the photodetector array 73 at the other end thereof. Here, since the optical connection between the first and second optical fiber bundles 65 and 71 is embodied by assembling a fitting member (33 in FIG. 3) into a fitting hole (31 in FIG. 3) as described above, detailed descriptions thereof are omitted.

When the optical connector 60' is configured as above, the sensitivity of the current signals transferred between the photodetector array 73 and the second signal processing unit 75 as well as the sensitivity of the current signals transferred between the first signal processing unit 61 and the semiconductor laser array 63' can be enhanced.

Though not shown in drawings, the optical fiber bundle may be provided between the first signal processing unit 61 and the semiconductor laser array 63' and the photodetector may be disposed to face the optical fiber bundle directly.

As described above, since in an assembly structure of a display of an electronic appliance according to the present invention, the display can be easily attached to a main body or detached from it, the display can be easily replaced with a display having a better resolution or a larger screen. When either the main body or the display malfunctions or reaches its use life, anyone of them can be replaced with ease. In addition, since an image signal is transferred by using light beams, the occurrence of electromagnetic waves can be reduced. In addition, noises, degradation of signals, and electromagnetic waves which occur when image signals are electrically transferred can be reduced by transferring image signals optically.

What is claimed is:

1. An assembly structure of a display of an electronic appliance intended to be employed in an electronic appliance including a main body and a display for displaying an image according to an image signal input from the main body so as to facilitate the attachment and detachment of the display to and from the main body including:
    a fitting means formed at the main body and the display, for providing both a physical attachment and an electrical connection between the main body and the display; and
    an optical connector provided at the main body and the display to be attached to the main body for transferring an image signal using light beams,
    wherein the fitting means includes a fitting hole and a fitting member for being inserted in the fitting hole, the fitting means securely attaching the main body and display together upon insertion of the fitting member into the fitting hole, and
    wherein a first electrode portion is at least partially disposed in the fitting hole and a second electrode portion is provided on the fitting member, so that the first and second electrode portions are electrically connected within the fitting hole upon insertion of the fitting member into the fitting hole,
    wherein at least one of the first and second electrodes includes an electrode bar slidably installed at at least one of the main body and the fitting member; and an elastic member interposed between at least one of the main body and the fitting member and the electrode bar for elastically biasing the electrode bar so that one end of the electrode bar is operative to project into the fitting hole.

2. The assembly structure of a display of an electronic appliance as claimed in claim 1, wherein the fitting member is attached to the display by hinges so that the display can be opened or closed by pivoting the display with respect to the main body with the fitting member is fitted into the fitting hole.

3. The assembly structure of a display of an electronic appliance as claimed in claim 1, wherein the fitting means further includes a locking means for locking the fitting member in the fitting hole.

4. The assembly structure of a display of an electronic appliance as claimed in claim 3, wherein the locking means includes:
    a locking member installed at at least one side of the fitting member facing a respective side wall of the fitting hole so that the locking member can move into or out of the fitting member;
    a locking recess formed at one side wall of the fitting hole of the main body for locking the locking member therein, and
    a lock releasing button installed at the fitting member so as to be disposed outside of the fitting hole when the fitting member is fitted into the fitting hole for releasing the locking member from the locking recess.

5. The assembly structure of a display of an electronic appliance as claimed in claim 1, wherein at least one guide means for guiding the insertion of the fitting member is formed at the fitting hole and the fitting member so as to prevent the fitting member from loosely moving within the fitting hole.

6. The assembly structure of a display of an electronic appliance as claimed in claim 1, wherein the optical connector includes:
    a first signal processing unit installed in the main body for converting an image signal output from the main body into a driving signal;
    a semiconductor laser array installed at the main body to face one surface of the fitting hole, and composed of a plurality of semiconductor lasers each independently irradiating a light beam according to a received driving signal; and
    a photodetector array installed at the fitting member to face the semiconductor laser array and to be spaced from it a distance, and composed of a plurality of photodetectors each independently converting a received light beam into an electrical signal; and
    a second signal processing unit for converting the electrical signals output from the photodetector array into image signals for the display.

7. The assembly structure of a display of an electronic appliance as claimed in claim 6, wherein the semiconductor laser array is composed of a plurality of vertical cavity surface emitting lasers emitting a light beam in a direction of the stack of semiconductor layers.

8. The assembly structure of a display of an electronic appliance as claimed in claim 6, wherein the optical connector further includes an optical fiber bundle which is disposed between the semiconductor laser array and the photodetector array and transfers light signals emitted from the semiconductor laser array to the photodetector array.

9. An assembly structure for facilitating the fitting of a display of an electronic appliance to a main body of the electronic appliance, comprising:

a fitting member provided at the display; and a fitting hole provided on the main body, for receiving the fitting member, wherein the insertion of the fitting member within the fitting hole provides for a physical attachment between the display and main body, and wherein an optical connector is disposed on the fitting member and is operative between the display and the main body when the fitting member having the optical member is received in the fitting hole, wherein at least one of the first and second electrodes includes an electrode bar slidably installed at at least one of the main body and the fitting member; and an elastic member interposed between at least one of the main body and the fitting member and the electrode bar for elastically biasing the electrode bar so that one end of the electrode bar is operative to project into the fitting hole.

10. An assembly structure of a display of an electronic appliance intended to be employed in an electronic appliance including a main body and a display for displaying an image according to an image signal input from the main body so as to facilitate the attachment and detachment of the display to and from a fitting hole of the main body including:

a fitting means installed at the display so as to be capable of being inserted into the fitting hole;

guide means formed at the fitting hole and the fitting member, respectively, for guiding the insertion of the fitting member, so as to prevent the fitting member from loosely moving within the fitting hole; and an optical connector provided at the main body and the display, for transferring an image signal using light beams, the optical connection comprising:

a first signal processing unit installed in the main body for converting an image signal output from the main body into a driving signal;

at least one semiconductor laser installed at the main body to face one surface of the fitting hole, for irradiating a light beam according to the driving signal output from the first signal processing unit;

at least one photodetector installed at the fitting member to face the semiconductor laser and to be spaced from it a distance, for converting a received light beam into an electrical signal;

a second signal processing unit for converting the electrical signals output from the photodetector into image signals for the display;

a first electrode portion installed at the main body so that one end of the first electrode portion can project into the fitting hole; and a second electrode portion installed at the fitting member to contact the first electrode portion when the fitting member has been inserted into the fitting hole, wherein the first and/or second electrodes comprises:
an electrode bar slidably installed at the main body and/or the fitting member; and
an elastic member interposed between the main body and/or the fitting member and the electrode bar for elastically biasing the electrode bar so that one end of the electrode bar can project into the fitting hole.

11. The assembly structure of a display of an electronic appliance as claimed in claim 10, wherein the fitting member is attached to the display by hinges so that the display can be opened or closed by pivoting the display with respect to the main body with the fitting member fitted into the fitting hole.

12. The assembly structure of a display of an electronic appliance as claimed in claim 10, further comprising a locking means for locking the fitting member in the fitting hole.

13. The assembly structure of a display of an electronic appliance as claimed in claim 10, wherein the locking means comprises:

a clamp installed at at least one side of the fitting member facing a respective side wall of the fitting hole so that the locking member can move into or out of the fitting member;

a lock releasing button installed at the fitting member so as to be disposed outside of the fitting hole when the fitting member is fitted into the fitting hole, for releasing the locking member from the locking recess; and a locking recess formed outside the fitting hole of the main body, for locking the clamp.

14. The assembly structure of a display of an electronic appliance as claimed in claim 10, wherein the semiconductor laser is a surface emitting laser emitting a light beam in a direction of the stack of semiconductor layers.

15. The assembly structure of a display of an electronic appliance as claimed in claims 10, wherein the optical connector further comprises an optical fiber bundle disposed between the semiconductor laser and the photodetector, for transferring the optical signals emitted form the semiconductor laser to the photodetector.

* * * * *